J. M. THORP.
EXPLOSION OIL ENGINE.
APPLICATION FILED JULY 16, 1917.
1,312,460.
Patented Aug. 5, 1919.
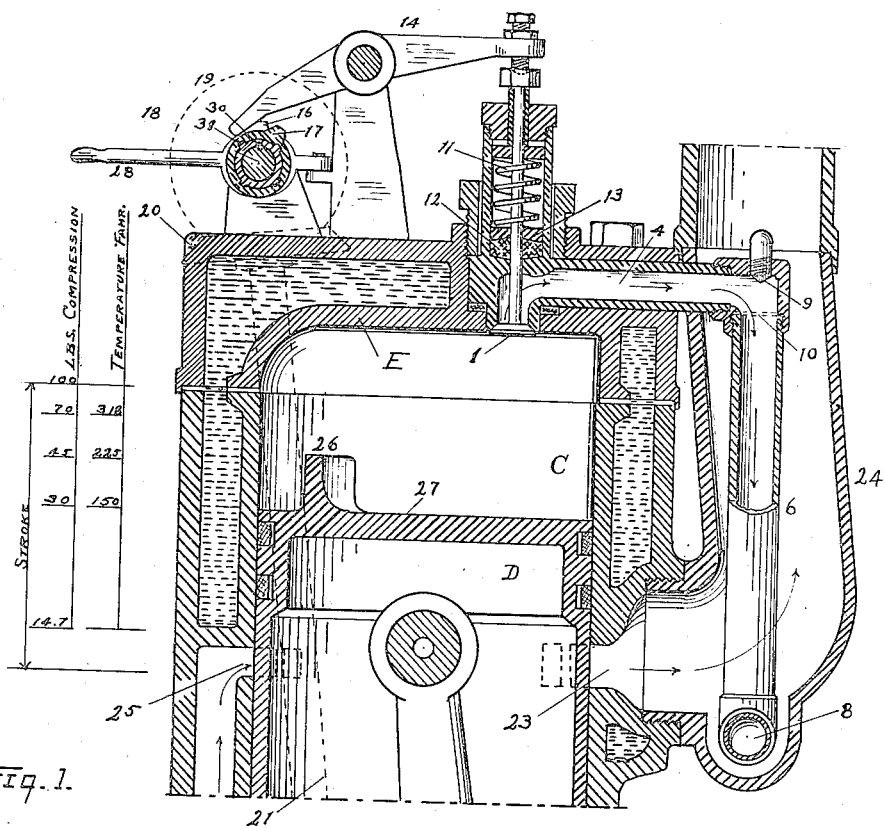
INVENTOR
J. M. Thorp.

UNITED STATES PATENT OFFICE.

JAMES MADISON THORP, OF ALAMEDA, CALIFORNIA.

EXPLOSION OIL-ENGINE.

1,312,460.	Specification of Letters Patent.	Patented Aug. 5, 1919.

Application filed July 16, 1917. Serial No. 180,828.

*To all whom it may concern:*

Be it known that I, JAMES MADISON THORP, a citizen of the United States, residing at Alameda, in the county of Alameda and State of California, have invented certain new and useful Improvements in Explosion Oil-Engines, of which the following is a specification.

My invention relates to explosion engines using heavy oil for fuel, and the objects of my invention are to utilize low-grade oils in engines of moderate compression pressures and to obtain high speed in the engine while operating on such fuel.

Methods of combustion employed heretofore in low-grade-oil engines produce slow piston speed because of slow burning of the fuel, the oil injected into the compressed air in the cylinder will not gasify rapidly enough to cause explosion of the charge. An engine to run at high speed must be operated on fuel that will explode, rather than a slow burning fuel. And since low-grade fuel oils in high speed engines will not gasify during the time allowed between injection of the fuel and ignition of the charge such fuel then, must be gasified before it enters the combustion chamber. Therefore another object of the invention is to provide a method whereby such fuel may have a time equal to one or more complete cycles of the engine to be converted into gas, then to allow the gas thus produced to enter the combustion chamber and mix with the air being compressed by the piston, then to ignite and explode the combustible charge thus obtained.

The method and apparatus hereinafter described is intended to work in conjunction with or in lieu of that described in my allowed application filed April 9, 1917, Serial Number 160,784. The primary difference in the two methods being in the retort intake time and the resultant composition of the retort charge; the former method utilizing the exploded gases from the cylinder to step up the retort pressure and supply a part of the heat for gasifying the fuel, while the present method uses the cylinder air during compression and before it is exploded for the same purpose. It is obvious that, if the time of the present retort intake valve were retarded so that it would open and close after explosion of the mixture in the cylinder the engine would then be operating on the former principle, the method of ejecting the gas from the retort into the cylinder is the same in either case.

It is also obvious that, whereas the present invention shows the retort inclosed in the exhaust pipe, to obtain radiated heat from the exhaust gases, it may be located in the cylinder head, as shown in the former invention, and receive the radiated heat direct from the explosion.

With these and other objects in view I will proceed to describe a method and apparatus embodying my invention, reference is had to the accompanying drawings, in which similar characters of reference denote similar parts throughout the several views.

Figure 1 is a vertical section through A B of Fig. 2; and Fig. 2 a top view of the engine.

The cylinder C and piston D are those of the ordinary two-stroke cycle engine, the invention lies wholly in the mechanism in the exhaust pipe and upon the cylinder head E, where I have shown two puppet valves, 1 is the retort inlet and 2 the outlet, the retort 3 consists of the passages 4 and 5, the legs 6 and 7 and the horizontal tube 8. 9 is the fuel nozzle leading from the usual fuel pump, not shown, whereby fuel is sprayed into the retort leg 6 against the screen 10. The valves are provided with springs 11 of sufficient strength to hold the valves closed against the retort pressure, the valve stems are packed as at 12, the spring 11 and washer 13 holds the packing compressed. The valves are operated by the walking-beams 14 and 15 which engage the cams 16 and 17 mounted upon the shaft 18 and operated by the gears 19 20 which are driven in the usual manner by the shaft 21.

The engine cylinder E is water-jacketed and is provided with the usual spark plug 22. Other and obvious parts, such as the lubricating system usually applied to engines of this character are omitted from the drawings.

In operation:

Assuming that the retort 3 has been charged with a rich mixture of fuel and air at a pressure of say 70 lbs. per square inch and at a temperature sufficient to gasify the fuel; and that the piston D is moving upward on the compression stroke, the cylinder having been supplied with pure air, and at piston position shown at 27 in Fig. 1 the air is compressed to 30 lbs. and 150 degrees temperature as shown by the scale: At this point outlet valve 2 will open allowing a portion of the gasified contents of the retort, now at 70 lbs. pressure, to eject itself into and commingle with the air being compressed in the cylinder under a pressure of 30 lbs. at this point, thus the retort pressure is equalized with that of the cylinder air which it carburizes while at a temperature sufficiently high to prevent condensation of the gas. Although the heat due to air compression at 30 lbs. is but 150 degrees, the addition of the hot retort gas and the quickly rising temperature of the air as the cylinder volume is further compressed will increase the temperature before the gas has time to thoroughly mix with the cooler air, so that when the piston is at the position of 45 lbs. by the scale the temperature will be much higher than that shown as due to compression, that is 225 degrees, when the outlet valve 2 closes at 45 lbs. pressure.

At some near point after the outlet valve 2 is closed, the inlet valve 1 will open allowing the cylinder content, now of increasingly greater pressure than that of the retort, to force a portion of the cylinder content through the inlet of the retort into passage 4 before the valve closes at compression pressure of 70 lbs. as shown by the scale.

At the desired point between the closing of valve 1 and the upper dead center the explosive charge in the cylinder is ignited by the spark-plug 22 creating a working pressure which operates upon the piston during the down stroke until the piston uncovers the exhaust port 23, when the burnt gas exhausts up through the pipe 24 and imparts a portion of its heat by radiation to the retort, and immediately after the exhaust port is uncovered, as described, the piston will uncover the air inlet port 25, whereupon air previously compressed in the crank-case of the engine, not shown, will enter the cylinder and be deflected upward by the baffle 26 to fill the upper part of the cylinder and drive out the remaining spent gases through the exhaust port in the usual manner. Then as the piston moves upward both ports will be covered, after which further upward movement of the piston, to the position 27, will compress the confined air to 30 lbs. as previously described and another cycle of the engine begins, then the above operations are repeated.

During each opening of valve 2, while the retort pressure is lowest, a charge of fuel is injected into the retort through the nozzle 9, then as the retort pressure is again brought up to the original 70 lbs., as described, and held over until the gas is ejected from the other end of the retort, a circulation is set up due to the alternate rise and fall of the retort pressure and the flow of the air through the long retort pipes always in one direction, and continually absorbing heat; that is, the hot highly compressed cylinder air going in at valve 1, mixing with and forcing the injected fuel through the screen and exhaust heated passages toward valve 2 where the pressure is relieved causing a pulsation that thoroughly churns the gas constituents.

Particular attention is called to the fact that only a portion of the retort contents, that at the outlet end, is ejected at each cycle of the engine; and that the products of a given quantity of fuel injected into the retort during a given cycle of the engine does not eject into the cylinder until say the third succeeding cycle, accordingly as the retort volume is proportioned to that of the cylinder; thus each charge of fuel has a time equal to more than one cycle of the engine to be converted into gas. And that the pulsations in the retort added to the comparatively long exposure to high heat in the presence of a proportionately small quantity of air will convert the fuel into a perfect gas too rich to explode until mixed with the proper quantity of air in the cylinder.

The fuel supply is regulated, according to varying load conditions, in any desired manner such as by a variable stroke pump; but for regulating the quantity of air circulating through the retort the variable valve timing cam 16 is provided, thus by moving the shift lever 28 toward the arrow the sleeve 29 is moved along the straight spline 30 on the shaft while the angle splines 31 turn the cam 16 to advance position, this will cause the valve 1 to open and close earlier in the cycle and close upon a lower compression pressure, say 60 lbs., thus there will be but 60 lbs. pressure and a corresponding quantity held over in the retort to eject into the cylinder pressure of 30 lbs. during the next succeeding cycle when valve 2 opens to admit the gas.

I have shown the invention as applied to a two-stroke cycle engine, I do not, however, confine myself to engines of any particular cycle, as this method is applicable to practically all engines, working on the internal combustion principle, without change in the invention proper, timing of the valves to suit the cycle being the only change necessary.

I prefer to inject the fuel at the time in the cycle described, the time may be varied considerably, however, without reducing the efficiency of the method.

I have also shown the preferred manner of construction, yet changes may be made therein without departing from the spirit of the invention, such for example, as locating the retort in the cylinder head where it will receive heat radiation direct from the explosion instead of from the exhaust gases.

Having thus clearly described my invention, what I claim as new and desire to secure by Letters Patent is—

1. In an explosion engine, the method of gasifying fuel, consisting of injecting fuel into a retort, then allowing a part of the air or mixture being compressed in an engine cylinder to enter one end of said retort, then closing said end of the retort, then opening the other end of said retort during the next succeeding compression stroke of the engine allowing some of the gasified contents of the retort to enter said cylinder whereby said gasified fuel is commingled with the air being compressed to form an explosive charge.

2. In an explosion engine, the method of gasifying fuel, consisting of injecting fuel into a retort, then opening one end of said retort so that some of the air or mixture being compressed in an engine cylinder will enter the retort at said open end, then closing said end, then igniting the mixture remaining in said cylinder whereby a working stroke of the engine is produced, then opening the other end of said retort during the next compression stroke so that a part of the gasified contents of the retort will enter the cylinder and carburize the air being compressed therein, then closing said other end.

3. In an explosion engine, the method of gasifying fuel, where a portion of the highly compressed air or mixture in an engine cylinder is forced into a retort passage at one end thereof, a charge of fuel injected into the retort passage at or near said end, then repeating the foregoing steps so that the first portion of compressed air or mixture and the first said charge of fuel is forced along said passage by the second portion of compressed air whereby said first portion of air and fuel remains in the retort for a time longer than one cycle of the engine, then allowing said first portion of fuel and air or mixture to eject from the retort into said cylinder to carburize the air being compressed therein.

4. In an explosion engine, the method of gasifying fuel, consisting in taking from an engine cylinder a portion of the highly compressed contents thereof, circulating the same through a retort where a charge of fuel has been ejected, then releasing a portion of said retort contents back into the cylinder to carburize the air being compressed therein.

5. In an explosion engine, a retort, communicating means between said retort and an engine cylinder, means for operating said communicating means during the first half of the engine compression stroke, means for injecting fuel into the retort, and operated means for opening communication during the second half of the compression stroke.

J. MADISON THORP.